United States Patent [19]
Reber

[11] Patent Number: 5,646,677
[45] Date of Patent: Jul. 8, 1997

[54] METHOD AND APPARATUS FOR INTERACTIVELY VIEWING WIDE-ANGLE IMAGES FROM TERRESTRIAL, SPACE, AND UNDERWATER VIEWPOINTS

[75] Inventor: William Louis Reber, Schaumburg, Ill.

[73] Assignee: Motorola, Inc., Schaumburg, Ill.

[21] Appl. No.: 392,705

[22] Filed: Feb. 23, 1995

[51] Int. Cl.$^6$ .................................................. H04N 7/173
[52] U.S. Cl. .............................. 348/13; 348/61; 348/36; 348/81; 348/117
[58] Field of Search .................................. 348/13, 12, 7, 348/36, 37, 38, 239, 240, 61, 63, 81, 117, 123; 455/4.2, 5.1, 6.3; H04N 7/16, 7/173

[56] References Cited

U.S. PATENT DOCUMENTS

| | | | |
|---|---|---|---|
| 4,175,269 | 11/1979 | Rebikoff | 348/81 |
| 5,185,667 | 2/1993 | Zimmermann | 358/209 |
| 5,236,199 | 8/1993 | Thompson, Jr. | 455/4.2 |
| 5,367,329 | 11/1994 | Nakagaki et al. | 348/1 |
| 5,384,588 | 1/1995 | Martin et al. | 348/36 |
| 5,432,871 | 7/1995 | Novik | 382/232 |
| 5,488,411 | 1/1996 | Lewis | 348/8 |

OTHER PUBLICATIONS

"Peering Out a 'Real Time' Window" by Peter H. Lewis, The New York Times, Wednesday, Feb. 8, 1995.

*Primary Examiner*—Michael H. Lee
*Assistant Examiner*—Chris Grant
*Attorney, Agent, or Firm*—Bruce E. Stuckman; Jeffrey G. Toler

[57] ABSTRACT

A broadcast for interactive viewing by a plurality of viewers is provided by contemporaneously capturing a plurality of wide-angle image sequences from a plurality of viewpoints. The viewpoints are selected from the group consisting of a space viewpoint, a terrestrial viewpoint, and an undersea viewpoint. The wide-angle image sequences are broadcasted to the viewers. Each of the viewers receives at least one of the wide-angle image sequences, and selects a portion of the at least one of the wide-angle image sequences. A perspective corrected view of the portion is displayed for view by the viewer. Optionally, prestored textual data and a perspective corrected view of a prestored image may also be displayed.

35 Claims, 4 Drawing Sheets

METHOD AND APPARATUS FOR INTERACTIVELY VIEWING WIDE-ANGLE IMAGES FROM TERRESTRIAL, SPACE, AND UNDERWATER VIEWPOINTS

RELATED INVENTIONS

The present invention is related to the following inventions which are assigned to the same assignee as the present invention:

(1) "Method and System for Broadcasting an Interactively Viewable Program", having Ser. No. 08/392,593, filed Feb. 23, 1995.

The subject matter of the above-identified related invention is incorporated by reference hereby into the disclosure of this invention.

FIELD OF THE INVENTION

The present invention relates to methods and systems for providing a broadcast for interactive viewing, and methods and systems for interactively viewing a broadcast.

BACKGROUND OF THE INVENTION

Various types of interactively-viewable broadcasts have been attempted over the past couple of decades. Broadcast Videotex systems, such as Teletext systems, utilize a one-way transmission of textual data from a program source to each of a plurality of receivers. Each of the receivers includes a user interface which allows a viewer to select and view desired pages of text included in the transmission. Interactive Videotex systems, such as Viewdata systems, further allow each viewer to transmit one or more signals to the program source. This allows each viewer to select the textual data being transmitted to the receivers.

Interactive cable television systems have been developed which allow each viewer to interact with the program source over a cable television distribution network. Each viewer is capable of providing and/or requesting various types of information. Interactive cable television systems have been utilized to provide services such as video-on-demand and home-shopping.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Embodiments of the present invention advantageously provide a broadcast which contains a plurality of wide-angle image sequences captured from a plurality of viewpoints. Each of a plurality of viewers is capable of interactively viewing the broadcast by selecting at least one wide-angle image sequence, and a corresponding portion of each of the at least one wide-angle image sequence. Each corresponding portion is transformed in real-time to display a perspective corrected view thereof to provide the viewer a telepresence within the viewed environment.

Figure 1:
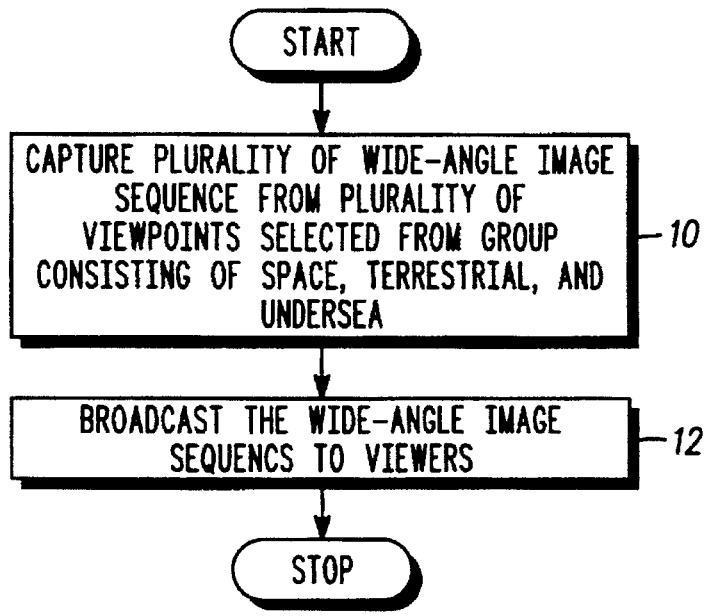
FIG. 1 is a flow chart of an embodiment of a method of providing a broadcast for interactive viewing by a plurality of viewers.

FIG. 1 is a flow chart of an embodiment of a method of providing a broadcast for interactive viewing by a plurality of viewers. As indicated by block 10, the method includes a step of capturing a plurality of wide-angle image sequences from a plurality of viewpoints. The plurality of viewpoints are selected from the group consisting of a space viewpoint, a terrestrial viewpoint, and an undersea viewpoint. In other words, the plurality of viewpoints contains at least two of the three above-mentioned viewpoint types. These viewpoints could be captured to formed a knowledge base which includes a sequence of images stored in an analog format such as on video tape or film, or in digital format on a mass storage device such as a tape, disk, CD-ROM or memory.

The space viewpoint provides a view of a portion of the Earth from space. Preferably, the space viewpoint originates from a camera located on a spacecraft, such as a satellite which orbits the Earth. Alternatively, the space viewpoint can originate from a camera located on a celestial body such as a planet or a moon or from an aircraft in flight.

The terrestrial viewpoint provides a view of a portion of the Earth from a generally land-level perspective (in comparison to a space-level perspective). The terrestrial viewpoint originates from a camera located near the surface of the Earth. The camera may be located within a building to provide a view of occurrences therein. For example, the camera may be located within a factory, within a Capitol Building, or within the United Nations General Assembly. Alternatively, the camera for a terrestrial viewpoint may be located outside, such as on top of a building or on a tower, to provide a view of occurrences outdoors.

The undersea viewpoint provides a view of a portion of the Earth from below the surface of a body of water. The undersea viewpoint originates from a camera located under the surface of the body of water. The camera may be affixed to an existing natural structure in the body of water, such as a coral reef, or to a man-made structure such as a platform of from moving objects such as a ships, submarines, etc.

In preferred embodiments, each of the plurality of wide-angle image sequences includes a plurality of successively-captured images such that an animated view of a portion of the Earth is produced when viewing the plurality of images in succession. It is also preferred that the plurality of viewpoints includes at least one space viewpoint, at least one terrestrial viewpoint, and at least one undersea viewpoint. In exemplary embodiments, the plurality of viewpoints include a plurality of space viewpoints, a plurality of terrestrial viewpoints, and a plurality of undersea viewpoints. This provides a plurality of different views of the Earth, and preferably, a plurality of different views of common portions of the Earth. For example, it is desirable to simultaneously capture images of a region of the Earth from both a terrestrial viewpoint and a space viewpoint.

It is preferred that the wide-angle image sequence for each viewpoint contains a plurality of images having a wide-angle field of view, as is produced by a camera having a wide-angle lens. A variety of wide-angle lenses are available, many having an angular field of view of at least 50 degrees. Lenses having a wider field of view, such as greater than 120 degrees, may also be utilized.

More preferably, the plurality of wide-angle image sequences contains a plurality of images having a portion or all (a subset) of a spherical field of view. Further, it is preferred that all of a plurality of objects in the field of view are substantially in focus in the plurality of images. These two properties may be produced, for example, using a fisheye lens as an optical element in a camera, however, many other wide-angle lenses using either traditional optics or holographic elements are also suitable for this application. The use of a plurality of cameras and a control system for aggregating the images from these cameras can provide a wide-angle image which includes an entire spherical field of view. While all of these embodiments of the present invention are possible, the examples which follow are presented in terms of a preferred embodiment wherein each of the plurality of wide-angle image sequences has substantially a hemispherical field of view with all objects contained therein being substantially in focus.

The method further comprises a step of broadcasting the plurality of wide-angle image sequences to the plurality of viewers, as indicated by block 12. The step of broadcasting includes a step of broadcasting a signal representative of the plurality of wide-angle image sequences for reception by a plurality of receivers, wherein each of the viewers has a corresponding one of the receivers. Hence, the terms "broadcast" and "broadcasting" is indicative of a "one-to-many" transmission or a "point-to-multipoint" transmission as is known in the art of communications.

It is preferred that the step of broadcasting includes a step of broadcasting at least one television signal representative of the plurality of wide-angle image sequences, wherein the at least one television signal is compatible with a television standard utilized in a resulting broadcast region. Compatibility with the television standard is beneficial in allowing use of standard television receivers to receive the wide-angle image sequences.

The wide-angle image sequences may be broadcasted to the viewers via an over-the-air transmission (either directly or via satellite), such as a standard over-the-air television transmission, or via a cable distribution system such as is employed in standard cable television transmissions. In these embodiments, it is preferred that the at least one television signal is selected from a group consisting of an NTSC (National Television Systems Committee) signal, a PAL (phase alternation each line) signal, and a SECAM (sequential color with memory) signal. Alternatively, the at least one television signal may be in accordance with an HDTV (high definition television) standard.

The plurality of wide-angle image sequences may be frequency-division multiplexed and/or time-division multiplexed (or time-division concentrated) within the at least one television signal. An example of a frequency-division multiplexed scheme is to broadcast a plurality of television signals at a plurality of different carrier frequencies, wherein each of the plurality of television signals is representative of a corresponding one of the plurality of wide-angle image sequences. An example of a time-division multiplexed scheme is to broadcast a single television signal containing images which alternate between the different wide-angle image sequences.

Alternatively, the wide-angle image sequences may be broadcasted to the viewers via a satellite. The satellite may be a communications satellite which broadcasts the wide-angle image sequences to a plurality of over-the-air television stations or to a plurality of cable television distribution systems. Here, the viewers receive the wide-angle image sequences via transmissions from either the over-the-air television stations or the cable television distribution systems. Alternatively, the satellite may be a direct broadcast satellite which broadcasts the wide-angle image sequences directly to the viewers. Here, the wide-angle image sequences may be broadcasted using frequency-division multiplexing, time-division multiplexing, and/or code-division multiplexing, for example.

Other alternatives for broadcasting the wide-angle image sequences include fiber optic systems and digital telephone carriers (such as an ISDN line). Here, it may be preferred to employ at least one digital signal to transmit the broadcast.

Regardless of the approach taken for performing the step of broadcasting, it is preferred that the plurality of wide-angle image sequences are provided to the viewers in real-time. In other words, the wide-angle image sequences are broadcasted to the viewers at substantially the same time at which the wide-angle image sequences are captured. It is noted that any delays inherent in signal processing, transmission, and/or distribution are allowed within a real-time broadcast.

By performing the above-mentioned steps, a broadcast containing a plurality of contemporaneous, animated views of the Earth is provided in real-time to each of the viewers. The broadcast may be interactively viewed by each of the viewers using embodiments of methods and systems described hereinafter.

Figure 2:
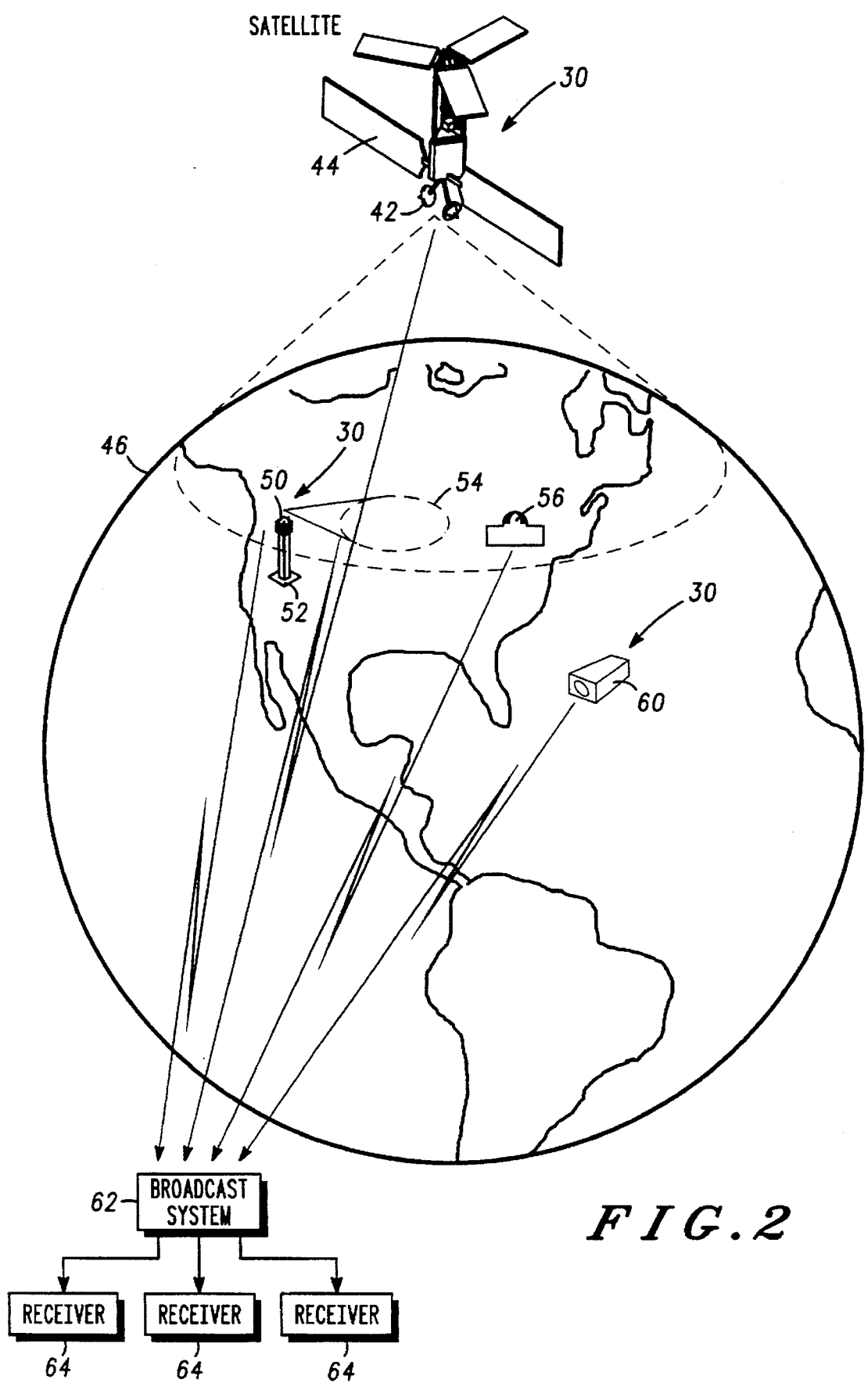
FIG. 2 is a schematic block diagram of an embodiment of a system for providing a broadcast for interactive viewing by a plurality of viewers.

FIG. 2 is a schematic block diagram of an embodiment of a system for providing a broadcast for interactive viewing by a plurality of viewers. The system includes a plurality of cameras 30 located at a plurality of viewpoints. The plurality of viewpoints are selected from the group consisting of a space viewpoint, a terrestrial viewpoint, and an undersea viewpoint. The plurality of cameras 30 contemporaneously capture a plurality of wide-angle image sequences from the plurality of viewpoints. The plurality of wide-angle image sequences may be captured in the form of either an analog signal or a digital signal.

Preferably, the space viewpoint is provided by a camera 42 located on a spacecraft such as a satellite 44 which orbits about the Earth 46. The camera 42 is oriented to have a portion of the Earth 46 in its field of view. The camera 42 captures a sequence of wide-angle images from the space viewpoint such that an animated view of the portion of the Earth 46 is provided. In order to have a stable viewpoint from space, the satellite 44 may be in a geosynchronous orbit about the Earth 46, and the camera 42 may be located on a despun platform (not specifically illustrated) of the satellite 44.

Although only one satellite is illustrated in FIG. 2, it is preferred to employ a plurality of spacecrafts each having a corresponding camera. In these embodiments, the plurality of viewpoints includes a plurality of space viewpoints.

The terrestrial viewpoint is provided by a camera 50 located near the surface of the Earth 46 (i.e., closer to the surface of the Earth 46 than the space viewpoint). For the purpose of illustration, the camera 50 is mounted on a tower 52 and oriented to have a portion 54 of the Earth 46 in its field of view. The camera 50 captures a sequence of wide-angle images to provide a generally land-level perspective of the portion 54 of the Earth 46. As illustrated, the portion 54 of the Earth 46 is contemporaneously viewable from both the space viewpoint and the terrestrial viewpoint, which is desirable in embodiments of the present invention.

Another terrestrial viewpoint may be provided by a camera (not specifically illustrated) located within a building or on either a stationary or transportable base adjacent to a desired scene, attraction or structure. For the purpose of illustration, the camera is located within the Capitol Building 56 in Washington D.C. The camera may have a fixed location within the House of Representatives Chamber, for example, to provide a view of activities occurring therein.

Hence, as illustrated, the plurality of viewpoints includes a plurality of terrestrial viewpoints. Although only two terrestrial viewpoints are illustrated, it is preferred to employ more than two cameras located near the surface of the Earth 46 so that more than two terrestrial viewpoints are provided.

The undersea viewpoint is provided by a camera 60 located below the surface of a body of water on the Earth 46. The body of water can include a river, a lake, a bay, a sea, or an ocean. As described earlier, the camera 60 can be mounted to a man-made structure in the body of water or a natural structure existing in the body of water. The camera 60 captures a sequence of wide-angle images from the undersea viewpoint to provide a view of activity below the surface of the body of water. It is preferred that the plurality of viewpoints includes a plurality of undersea viewpoints, provided by a plurality of cameras located beneath the surface of various bodies of water located on the Earth 46.

The system further includes a broadcast system 62 operatively associated with the plurality of cameras 30. The broadcast system 62 is utilized for broadcasting the plurality of wide-angle image sequences to the plurality of viewers. The broadcast system 62 broadcasts a signal representative of the plurality of wide-angle image sequences for reception by a plurality of receivers 64, wherein each of the viewers has a corresponding one of the receivers 64. It is preferred that the broadcast system 62 broadcasts at least one television signal representative of the plurality of wide-angle image sequences, the at least one television signal being compatible with a television standard utilized in the broadcast region. As a result, each of the plurality of receivers 64 may include a standard television receiver.

Figure 3:
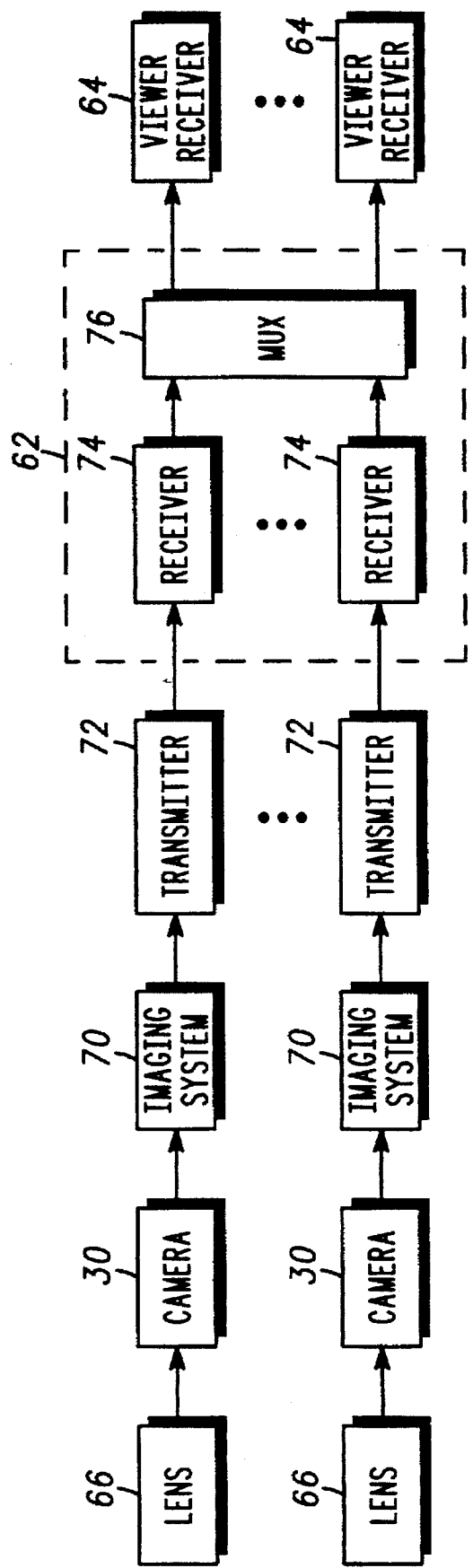
FIG. 3 is a block diagram of an embodiment of a system for providing a broadcast for interactive viewing.

FIG. 3 is a block diagram of an embodiment of a system for providing a broadcast for interactive viewing. Each of the plurality of cameras 30 located at the plurality of viewpoints includes a wide-angle lens 66 as its optical element. Each wide-angle lens 66 has a wide-angle field of view, typically greater than 50 degrees, and more preferably, is greater than 120 degrees.

In exemplary embodiments, each of the plurality of cameras includes a wide-angle lens which produces a substantially hemispherical field of view, i.e., an angular field of view of approximately 180 degrees. The wide-angle lens further has a property that all objects contained within the field of view are substantially in focus.

Each of the plurality of cameras 30 produces a signal representative of a sequence of wide-angle images captured thereby. The signal may be either a digital signal or an analog signal.

Each of the plurality of cameras is operatively associated with an imaging system 70. The imaging system 70 performs steps of signal and image processing based upon the signal produced by its corresponding camera. For example, the imaging system 70 may perform steps of digitizing a signal, transforming a signal, compressing a signal using any number of compression techniques such as fractal compression, temporarily storing a signal, and/or modulating a signal.

Each imaging system 70 is operatively associated with a transmitter 72 which transmits the sequence of wide-angle images to the broadcast system 62. As a result, the broadcast system 62 receives the plurality of wide-angle image sequences from each of the plurality of viewpoints. A variety of different means for transmitting images to the broadcast system 62 may be employed by each transmitter 72. These means can be based upon radio frequency transmission, satellite transmission, point-to-point microwave transmission, transmission via digital telephone carriers, and/or transmission via fiber optic links, for example.

The broadcast system 62 includes a plurality of receivers 74 for receiving the plurality of wide-angle image sequences from the plurality of viewpoints. For example, each receiver 74 may include a radio frequency receiver, a satellite receiving dish, a point-to-point microwave receiver, an interface to a digital telephone network, and/or a fiber optic receiver. The receiver 74 provides the plurality of wide-angle image sequences to a multiplexer 76. The multiplexer 76 multiplexes the wide-angle image sequences for transmission to the plurality of receivers 64 (for the plurality of viewers).

Many embodiments of the broadcast system 62 can be formulated. In one embodiment, the broadcast system 62 broadcasts an over-the-air television signal representative of the plurality of wide-angle image sequences. The over-the-air television signal is formatted in accordance with an existing television standard in a broadcast region serving the viewers. Hence, the over-the-air television signal may be an NTSC signal, a PAL signal, or a SECAM signal. The wide-angle image sequences from the plurality of viewpoints may be time-division multiplexed to form successive frames within the over-the-air television signal.

In a second embodiment, the broadcast system 62 employs a cable television distribution system to broadcast the wide-angle image sequences to the viewers. A single cable television channel may be employed to transmit the images using the above-described time-division multiplexing approach. Alternatively, the wide-angle image sequences may be frequency-division multiplexed wherein each of the viewpoints is allocated its own channel (i.e., its own band of frequencies). Specifically, each of the viewpoints may be allocated its own cable television channel for broadcasting its wide-angle image sequence to the viewers.

In a third embodiment, the broadcast system 62 employs a direct broadcast satellite to transmit the wide-angle image sequences to the viewers. The wide-angle image sequences may be frequency-division multiplexed wherein each of the viewpoints is allocated its own transponder channel. Alternatively, the wide-angle image sequences may be time-division modulated or code-division modulated.

In a fourth embodiment, the broadcast system 62 utilizes digital carriers within a telephone network to digitally transmit the wide-angle image sequences to the viewers. Here, the broadcast system 62 may be part of an online service to which a viewer may subscribe.

In a fifth embodiment, the broadcast system 62 comprises a communication satellite which receives the plurality of wide-angle image sequences, and transmits the wide-angle image sequences to a plurality of cable television distribution systems.

By using the above-described embodiments of the present invention, a broadcast containing a plurality of contemporaneous, animated views of the Earth (e.g. terrestrial, space or undersea) is provided in real-time to each of the viewers. The broadcast may be interactively viewed by each of the viewers using embodiments of methods and systems described hereinafter.

Figure 4:
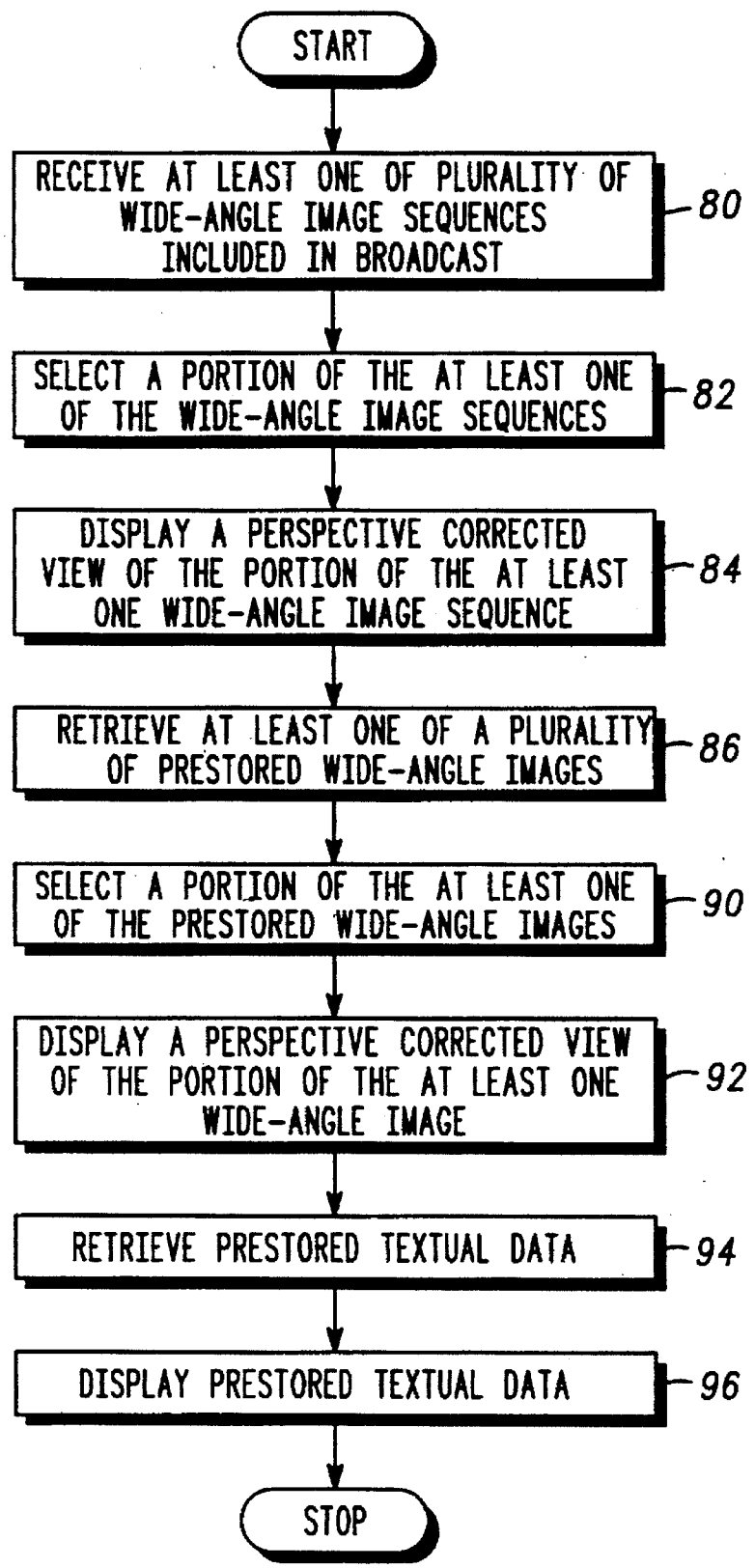
FIG. 4 is a flow chart of an embodiment of a method of interactively viewing a broadcast.

FIG. 4 is a flow chart of an embodiment of a method of interactively viewing a broadcast. The broadcast, which may be produced using embodiments of the above-described methods and systems, includes a plurality of wide-angle image sequences captured from a plurality of viewpoints. The viewpoints are selected from the group consisting of a space viewpoint, a terrestrial viewpoint, and an undersea viewpoint. In other words, the plurality of viewpoints includes at least two of the three above-mentioned viewpoint types.

Preferably, the plurality of viewpoints includes at least one space viewpoint, at least one terrestrial viewpoint, and at least one undersea viewpoint. More preferably, the plurality of viewpoints includes a plurality of space viewpoints, a plurality of terrestrial viewpoints, and a plurality of undersea viewpoints. In an exemplary embodiment, the plurality of space viewpoints provides a full view of the Earth 46.

Further, it is preferred that the plurality of wide-angle image sequences includes a plurality of images having a hemispherical field of view, wherein all of a plurality of objects in the hemispherical field of view are substantially in focus.

The method includes a step of receiving at least one of the plurality of wide-angle image sequences included in the broadcast, as indicated by block 80. The step of receiving includes a step of receiving a signal representative of the at least one of the plurality of wide-angle image sequences. The signal may be received via an over-the-air television transmission, a cable television transmission, a direct broadcast satellite transmission, or a transmission via a digital telephone carrier.

It is preferred that the broadcast includes a television signal representative of the at least one of the plurality of wide-angle image sequences, the television signal selected from the group consisting of an NTSC signal, a PAL signal, and a SECAM signal. Here, the step of receiving the at least one of the plurality of wide-angle image sequences includes a step of receiving the television signal.

The method further includes a step of selecting a portion of at least one of the plurality of wide-angle image sequences, as indicated by block 82. Typically, the portion is selected by a viewer-performed action using a user interface. For example, the portion may be selected by the viewer by a combination of point, click, and/or drag operations with a mouse. The step of selecting the portion may include a step of selecting a viewing angle and/or a step of selecting a magnification for a perspective corrected view of the portion which is produced. In this embodiment of the present invention, the use of a compression method whose resolution is magnification-independent (such as a fractal compression method) is used to insure picture quality for magnification ratios greater than 1.

As indicated by block 84, the method includes a step of displaying a perspective corrected view of the portion of the at least one of the plurality of wide-angle image sequences. In one embodiment, the step of displaying the perspective corrected view includes the steps of processing the portion of the at least one of the plurality of wide-angle image sequences to produce a signal representative of the perspective corrected view, and displaying the perspective corrected view based upon the signal.

For wide-angle image sequences having a substantially hemispherical field of view, the step of processing may be performed in accordance with methods disclosed in U.S. Pat. No. 5,185,667 to Zimmermann ("the Zimmermann patent"), which is incorporated herein by reference. The Zimmermann patent discloses methods and systems for electronically transforming portions of wide-angle images to form perspective corrected images in real-time.

Alternatively, the step of displaying a perspective corrected view includes a step of displaying the portion of the at least one of the plurality of wide-angle image sequences on a display device having a nonuniform pixel density. The nonuniform pixel density is utilized for performing the perspective corrected transformation of the portion of the at least one of the wide-angle image sequences directly on the display device.

By performing the steps indicated by blocks 80, 82, and 84, a viewer is capable of interactively viewing events occurring on the Earth in real-time. In particular, each viewer is capable of selecting at least one viewpoint from which the events are to be viewed. Further, each viewer is capable of selecting the portion of a corresponding at least one wide-angle image sequence which is to be viewed.

Optionally, the method further includes a step of retrieving at least one of a plurality of prestored wide-angle images, as indicated by block 86. The prestored wide-angle images may be captured using a wide-angle lens, a camera, and an imaging system as described earlier. In one embodiment, the prestored wide-angle images are stored on a CD-ROM (compact disk read only memory).

Optionally, the method further includes a step of selecting a portion of the at least one of the plurality of prestored wide-angle images, as indicated by block 90, and a step of displaying a perspective corrected view of the portion of the at least one of the plurality of prestored wide-angle images, as indicated by block 92. These steps may be performed in a manner similar as described for the steps indicated by blocks 82 and 84. By performing the steps indicated by blocks 86, 90 and 92, each viewer is further capable of interactively viewing prestored images which augment a real-time view of events occurring on the Earth.

As a further option, the method further includes a step of retrieving prestored textual data, as indicated by block 94, and a step of displaying the prestored textual data, as indicated by block 96. Here, each viewer is further capable of augmenting displayed images with text. The text may provide background and/or historical information associated with the displayed images. The prestored textual data may be stored on the CD-ROM used to store the prestored wide-angle images.

Figure 5:
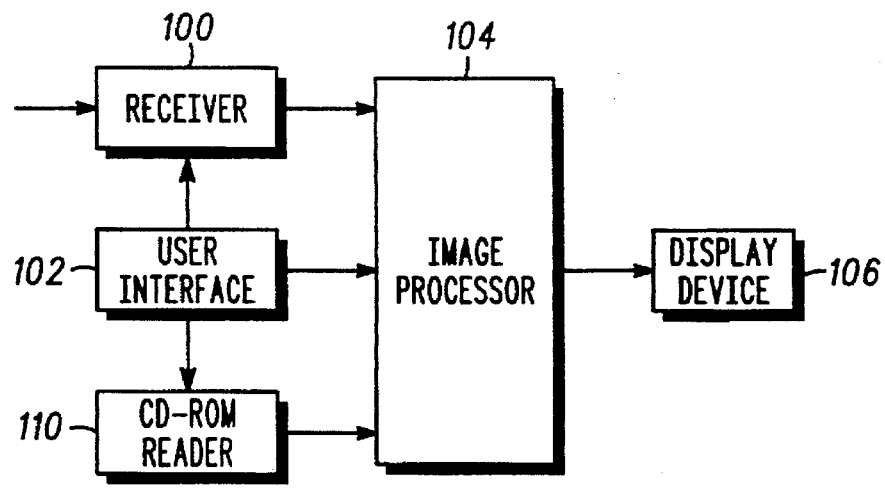
FIG. 5 is a block diagram of an embodiment of a system for interactively viewing a broadcast.

FIG. 5 is a block diagram of an embodiment of a system for interactively viewing a broadcast, the broadcast including a plurality of wide-angle image sequences contemporaneously captured from a plurality of viewpoints. The system includes a receiver 100 which receives at least one of the plurality of wide-angle image sequences included in the broadcast. Typically, the receiver 100 receives a signal representative of the at least one of the plurality of wide-angle image sequences. The signal may be received via an over-the-air transmission, a cable transmission, a direct broadcast satellite transmission, or a transmission via a digital telephone carrier.

If the broadcast includes a television signal selected from the group consisting of an NTSC signal, a PAL signal, and a SECAM signal, the receiver 100 may include a standard television receiver (not specifically illustrated) which receives the television signal.

The system further includes a user interface 102 operatively associated with the receiver 100. The user interface 102 is employed for selecting the at least one of the plurality of wide-angle image sequences which is to be received. Further, the user interface 102 is utilized for selecting a portion of the at least one of the plurality of wide-angle image sequences. In selecting the portion of the at least one of the plurality of wide-angle image sequences, the user interface 102 may be utilized to perform a step of selecting a viewing angle and/or a step of selecting a magnification for a perspective corrected view which is to be produced.

The user interface 102 includes an input device such as one or more buttons, a keyboard, a mouse, a joystick, a lightpen, a trackball, a touchpad, or a touchscreen, to permit a viewer to select at least one image sequence and at least one portion thereof. Preferably, the user interface 102 includes a graphical user interface capable of displaying icons and allowing the viewer to make selections using a combination of point, click, and/or drag operations with a mouse.

The system further includes an image processor 104 which processes the portion of the at least one of the plurality of wide-angle image sequences to produce a signal representative of a perspective corrected view. In a preferred embodiment, the image processor 104 includes a system for electronically transforming the portion of the at least one of the plurality of wide-angle image sequences as disclosed in the Zimmermann patent. Here, the image processor 104 transforms a digitized representation of the portion using a real-time image transform processor. Other transformation performed either spatially by the distribution of sensing elements on the imaging sensor or through alternative computation means such as using a ray-imaging process.

A display device 106 displays the perspective corrected view based upon the signal provided by the image processor 104. AS a result, the image processor 104 and the display device 106 provide means for displaying the perspective corrected view of the portion of the at least one of the plurality of wide-angle image sequences, wherein the means for displaying is operatively associated with the receiver 100 and the user interface 102. The display device 106 may include a cathode ray tube or a liquid crystal display, for example, to provide a display.

Alternatively, the image transformation may be performed directly using the display device 106. Here, the display device 106 has a nonuniform pixel density to directly transform the portion into a perspective corrected view.

Optionally, the system further includes means for retrieving at least one of a plurality of prestored wide-angle images. Preferably, the plurality of prestored wide-angle images are stored on a CD-ROM, and a CD-ROM reader 110 provides the means for retrieving the at least one of the wide-angle images. It should be apparent, however, that other types of storage devices may be substituted for the CD-ROM reader 110 to provide means for retrieving an image.

The CD-ROM reader 110 is operatively associated with the user interface 102 so that the user interface 102 allows the viewer to select the at least one of the wide-angle images, and to select a portion of the at least one of the wide-angle images. The portion is provided to the image processor 104, which produces a signal representative of a perspective corrected view of the portion. The display device displays the perspective corrected view based upon the signal.

As a further option, the CD-ROM includes prestored textual data which may be retrieved by the CD-ROM reader 110 in response to a command given via the user interface 102. The textual data may be displayed on the display device 106 to augment the perspective corrected views.

Typically, the user interface 102 and the display device 106 are physically located at a viewer premise. However, each of the receiver 100, the image processor 104, and CD-ROM reader 110 may be located either at the premise or off the premise.

For example, the receiver 100 and the image processor 104 may be located at a central location away from the viewer premise. The user interface 102 provides a first signal to the central location indicative of a selection of at least one wide-angle image sequence, and a second signal indicative of a selected portion of the at least one wide-angle image sequence. The central location receives the at least one wide-angle image sequence and transforms the selected portion to form a third signal representative of a perspective corrected view. The third signal is transmitted to the viewer premise so that the perspective corrected view may be displayed on the display device 106.

Similarly, the CD-ROM reader 110 may be located at a central location. In response to first signals provided by the user interface 102, the CD-ROM reader 110 provides second signals which are transmitted to the viewer premise. The second signals may include prestored textual data and/or perspective corrected views of prestored wide-angle images.

Embodiments of the system may include a multimedia personal computer which includes the user interface 102, the image processor 104, the display device 106, and/or the CD-ROM reader 110. Other embodiments of the system may be in the form of an interface/receiver box which provides RF signals representative of perspective corrected views to a standard television receiver connected thereto. In still other embodiments, the system may be in the form of a wireless device which includes the user interface 102, the image processor 104, and/or the display device 106.

In order to illustrate the use of embodiments of the present invention, an example of interactively viewing a broadcast is given. The broadcast includes a plurality of wide-angle image sequences each having a hemispherical field of view. The plurality of wide-angle image sequences are contemporaneously captured from a plurality of space viewpoints, a plurality of terrestrial viewpoints, and a plurality of undersea viewpoints.

Suppose that a viewer wishes to telepresently view the effects of a major hurricane which is wreaking havoc in a region of the United States. Using the user interface 102, the viewer selects a plurality of viewpoints from which the region is to be viewed. The viewer selects one of the space viewpoints having the region within its field of view, one of the terrestrial viewpoints having a portion of the region within its field of view, and one of the undersea viewpoints located in a body of water near the region. Further, the viewer selects another terrestrial viewpoint which provides a view of activity within the House of Representatives. Preferably, each of the four above-mentioned viewpoints is assigned a display window on the display device 106.

Using the user interface 102, the viewer navigates each display window by selecting a desired portion of each wide-angle image sequence. In this example, the viewer increasingly magnifies a portion of the space viewpoint images until a desired high-level view of the region is displayed. Further, the viewer modifies a viewing angle for the terrestrial viewpoint images in order to obtain a ground-level view of damage which has occurred within the region. It is noted that the cameras which provide the wide-angle image sequences are not repositioned in response to viewer interactivity with the broadcast. Further, the signals which are broadcasted need not be modified in response to viewer interactivity.

The viewer may then select a prestored wide-angle image captured from the selected one of the terrestrial viewpoints before the hurricane struck. The prestored wide-angle image, which is stored on a CD-ROM, is retrieved by the CD-ROM reader 110. Using the user interface 102, the viewer navigates a fifth display window to obtain a desired pre-hurricane, ground-level view of the region. The viewer may then compare the pre-hurricane view of the region to a post-hurricane view of the region to study the effect of the hurricane.

Further, the viewer may retrieve and display textual data stored on the CD-ROM. The textual data may provide background information on the region which is viewed, or general information on hurricanes, for example. The viewer may also navigate a display window associated with the view of the House of Representatives to view a Congressional debate regarding emergency appropriations for hurricane relief.

Similarly, the present invention could be used by a viewer for tele-travel or other forms of telepresence to project himself or herself into a real (rather than virtual) environment. In effect, the display provides a tele-porthole to this real environment.

Thus, there has been described herein a concept, as well as several embodiments including preferred embodiments of a method and system for providing an interactively viewable broadcast.

Because the various embodiments of methods and systems for providing an interactively viewable broadcast as herein-described utilize wide-angle image sequences from a plurality of viewpoints, they provide a significant improvement in that each viewer may select desired ones of the viewpoints and desired portions of each viewpoint to be displayed in real-time. As a result, each viewer is capable of a unique, real-time view of events on the Earth based on a common broadcast.

Additionally, the various embodiments of the present invention as herein-described use prestored wide-angle images and prestored textual data to augment the real-time view.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method of interactively viewing a broadcast program, the broadcast program including a plurality of wide-angle image sequences contemporaneously captured from a plurality of viewpoints, the plurality of viewpoints selected from the group consisting of a space viewpoint, a terrestrial viewpoint, and an undersea viewpoint, the plurality of wide-angle image sequences providing a plurality of different views of a region, the method comprising the steps of:

selecting at least one desired viewpoint from which the region is to be viewed;

receiving at least one of the plurality of wide-angle image sequences included in the broadcast program to provide the at least one desired viewpoint from which the region is to be viewed;

selecting a portion of the at least one of the plurality of wide-angle image sequences; and displaying a perspective corrected view of the portion of the at least one of the plurality of wide-angle image sequences.

2. The method of claim 1 wherein the plurality of viewpoints includes a plurality of space viewpoints of the region.

3. The method of claim 1 wherein the plurality of viewpoints includes a plurality of terrestrial viewpoints of the region.

4. The method of claim 1 wherein the plurality of viewpoints includes a plurality of undersea viewpoints of the region.

5. The method of claim 1 wherein the plurality of viewpoints includes at least one space viewpoint, at least one terrestrial viewpoint, and at least one undersea viewpoint of the region.

6. The method of claim 1 wherein the broadcast program includes a television signal representative of the at least one of the plurality of wide-angle image sequences, the television signal selected from the group consisting of an NTSC signal, a PAL signal, and a SECAM signal.

7. The method of claim 6 wherein the step of receiving the at least one of the plurality of wide-angle image sequences includes a step of receiving the television signal.

8. The method of claim 6 wherein the plurality of wide-angle image sequences includes a plurality of images having a subset of a spherical field of view.

9. The method of claim 8 wherein all of a plurality of objects in the subset of the spherical field of view are substantially in focus.

10. The method of claim 1 further comprising a step of retrieving at least one of a plurality of prestored wide-angle images of the region.

11. The method of claim 10 wherein the plurality of prestored wide-angle images are stored on a CD-ROM.

12. The method of claim 10 further comprising steps of:
   selecting a portion of at least one of the plurality of prestored wide-angle images; and
   displaying a perspective corrected view of the portion of the at least one of the plurality of prestored wide-angle images.

13. The method of claim 1 wherein the step of displaying the perspective corrected view includes the steps of:
   processing the portion of the at least one of the plurality of wide-angle image sequences to produce a signal representative of the perspective corrected view; and
   displaying the perspective corrected view based upon the signal.

14. The method of claim 1 wherein the step of displaying the perspective corrected view includes the step of displaying the portion of the at least one of the plurality of wide-angle image sequences on a display device having a nonuniform pixel density.

15. The method of claim 1 wherein the step of selecting a portion of the at least one of the plurality of wide-angle image sequences includes a step of selecting a viewing angle for the perspective corrected view.

16. The method of claim 1 wherein the step of selecting a portion of the at least one of the plurality of wide-angle image sequences includes a step of selecting a magnification for the perspective corrected view.

17. A method of interactively viewing a broadcast, the broadcast including a plurality of wide-angle image sequences having a hemispherical field of view, the plurality of wide-angle image sequences contemporaneously captured from a plurality of viewpoints, the plurality of viewpoints including at least one space viewpoint, at least one terrestrial viewpoint, and at least one undersea viewpoint, the plurality of wide-angle image sequences providing a plurality of different views of a region of the Earth, the method comprising the steps of:

selecting at least one desired viewpoint from which the region of the Earth is to be viewed;

receiving a signal representative of at least one of the plurality of wide-angle image sequences to provide the at least one desired viewpoint from which the region is to be viewed;

selecting a portion of the at least one of the plurality of wide-angle image sequences;

processing the portion of the at least one of the plurality of image sequences to produce a first signal representative of the perspective corrected view;

displaying the perspective corrected view based upon the first signal;

retrieving at least one of a plurality of prestored wide-angle images of the region;

selecting a portion of at least one of the plurality of prestored wide-angle images;

processing the portion of the at least one of the plurality of prestored wide-angle images to produce a second signal representative of the perspective corrected view; and displaying the perspective corrected view based upon the second signal.

18. A system for interactively viewing a broadcast, the broadcast including a plurality of wide-angle image sequences contemporaneously captured from a plurality of viewpoints, the plurality of viewpoints selected from the group consisting of a space viewpoint, a terrestrial viewpoint, and an undersea viewpoint, the plurality of wide-angle image sequences providing a plurality of different views of a region, the system comprising:

a receiver which receives at least one of the plurality of wide-angle image sequences included in the broadcast to provide at least one desired viewpoint from which the region is to be viewed;

a user interface for selecting a portion of the at least one of the plurality of wide-angle image sequences; and means for displaying a perspective corrected view of the portion of the at least one of the plurality of wide-angle image sequences, the means for displaying operatively associated with the receiver and the user interface.

19. The system of claim 18 wherein the plurality of viewpoints includes a plurality of space viewpoints of the region.

20. The system of claim 18 wherein the plurality of viewpoints includes a plurality of terrestrial viewpoints of the region.

21. The system of claim 18 wherein the plurality of viewpoints includes a plurality of undersea viewpoints of the region.

22. The system of claim 18 wherein the plurality of viewpoints includes at least one space viewpoint, at least one terrestrial viewpoint, and at least one undersea viewpoint of the region.

23. The system of claim 18 wherein the broadcast includes a television signal representative of the at least one of the plurality of wide-angle image sequences, the television signal selected from the group consisting of an NTSC signal, a PAL signal, and a SECAM signal.

24. The system of claim 23 wherein the receiver receives the television signal representative of the at least one of the plurality of wide-angle image sequences.

25. The system of claim 18 wherein the plurality of wide-angle image sequences contains a plurality of images having a subset of a spherical field of view.

26. The system of claim 25 wherein all of a plurality of objects in the subset of the spherical field of view are substantially in focus.

27. The system of claim 25 further comprising means for retrieving at least one of a plurality of prestored wide-angle images of the region, the means for retrieving operatively associated with the user interface.

28. The system of claim 27 wherein the means for retrieving includes a CD-ROM reader for use with a CD-ROM which contains the plurality of prestored wide-angle images.

29. The system of claim 27 wherein the user interface allows selecting of a portion of the at least one of the plurality of prestored wide-angle images, and wherein the means for displaying displays a perspective corrected view of the portion of the at least one of the plurality of prestored wide-angle images.

30. The system of claim 18 wherein the means for displaying the perspective corrected view includes:

an image processor which processes the portion of the at least one of the plurality of wide-angle image sequences to produce a signal representative of the perspective corrected view.

31. The system of claim 30 wherein the means for displaying the perspective corrected view includes a display device which displays the perspective corrected view based upon the signal provided by the image processor.

32. The system of claim 18 wherein the means for displaying the perspective corrected view includes a display device having a nonuniform pixel density, wherein the portion of the at least one of the plurality of wide-angle image sequences is displayed on the display device.

33. The system of claim 18 wherein the user interface is utilized to perform a step of selecting a viewing angle for the perspective corrected view.

34. The system of claim 18 wherein the user interface is utilized to perform a step of selecting a magnification for the perspective corrected view.

35. A system for interactively viewing a broadcast, the broadcast including a plurality of wide-angle image sequences having a hemispherical field of view, the plurality of wide-angle image sequences contemporaneously captured from a plurality of viewpoints, the plurality of viewpoints including at least one space viewpoint, at least one terrestrial viewpoint, and at least one undersea viewpoint, the plurality of wide-angle image sequences providing a plurality of different views of a region of the Earth, the system comprising:

a receiver which receives a signal representative of at least one of the plurality of wide-angle image sequences to provide at least one desired viewpoint from which the region of the Earth is to be viewed;

a CD-ROM reader for retrieving at least one of a plurality of prestored wide-angle images of the region stored on a CD-ROM;

a user interface for selecting a portion of the at least one of the plurality of wide-angle image sequences, the user interface further for selecting a portion of at least one of the plurality of prestored wide-angle images;

an image processor which processes the portion of the at least one of the plurality of image sequences to produce a first signal representative of a first perspective corrected view of the region, the image processor further processing the portion of the at least one of the plurality of prestored wide-angle images to produce a second signal representative of a second perspective corrected view of the region;

a display device which displays the first perspective corrected view and the second perspective corrected view based upon the first signal and the second signal.

* * * * *